Sept. 1, 1931.  C. P. BERG  1,821,289
APPARATUS FOR MORTAR MANUFACTURE
Original Filed Feb. 8, 1926   3 Sheets-Sheet 1

Inventor
Christian P. Berg
by Parker & Carter
Attorneys.

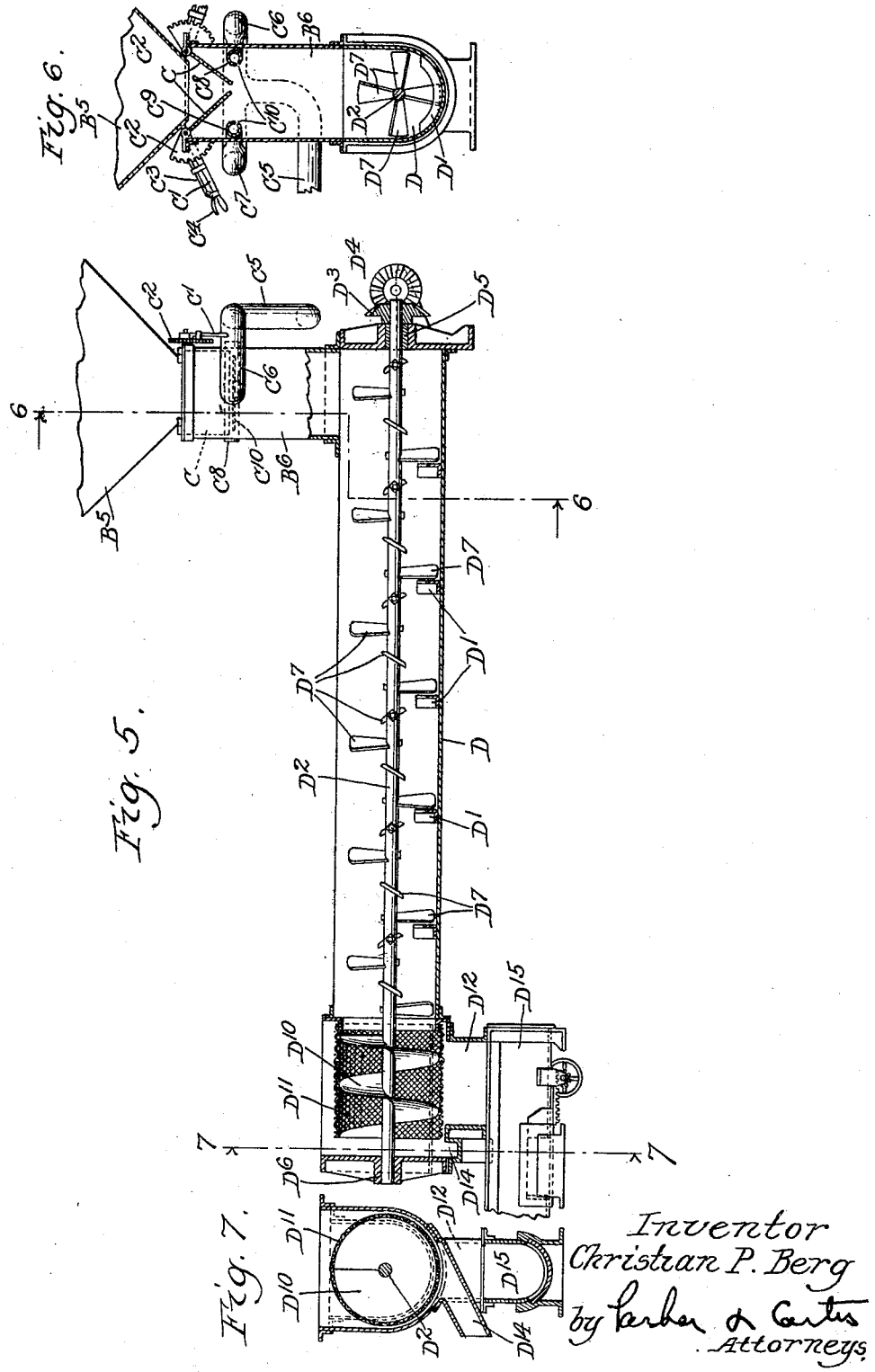

Sept. 1, 1931. C. P. BERG 1,821,289
APPARATUS FOR MORTAR MANUFACTURE
Original Filed Feb. 8, 1926   3 Sheets-Sheet 3

Inventor
Christian P. Berg
by Parker & Carter
Attorneys

Patented Sept. 1, 1931

1,821,289

UNITED STATES PATENT OFFICE

CHRISTIAN P. BERG, OF CHICAGO, ILLINOIS

APPARATUS FOR MORTAR MANUFACTURE

Original application filed February 8, 1926, Serial No. 86,700, now Patent No. 1,679,149, dated July 31, 1928. Divided and this application filed February 9, 1928. Serial No. 252,963.

My invention relates to an improvement in means for preparing mortar. It has for one object to provide a means for slaking lime, purifying the slaked lime and supplying the slaked lime for use. Other objects will appear from time to time in the course of the specification and claims. The present application is a division of Patent No. 1,679,149, issued on July 31, 1928.

I illustrate my invention more or less diagramatically in the accompanying drawings, wherein—

Figure 5 is an enlarged side view of the lime and water mixing or slaking apparatus;

Figure 6 is a section on the line 6—6 of Figure 5;

Figure 7 is a section on the line 7—7 of Figure 5;

Like parts are indicated by like figures throughout the specification and drawings.

Figure 4:
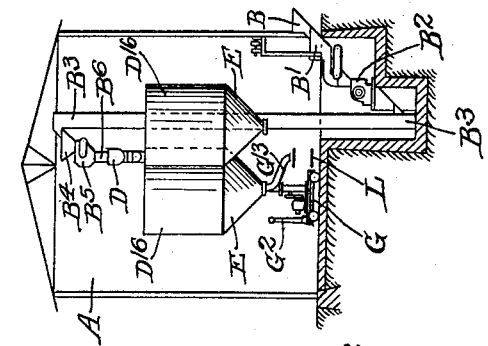
Figure 4 is a section on the line 3—4 of Figure 2, looking in the opposite direction.

Referring particularly to Figures 1 to 4, my apparatus may be housed in any suitable enclosing structure A and is preferably positioned adjacent railroad tracks $A^1$ upon which may be spotted the cars $A^2$, $A^3$. Referring to Figure 4 the lime may be delivered from the car $A^2$ along any suitable chute B to the apron conveyor feeder $B^1$, which in turn delivers the material for crushing, for example to the hammer mill crusher $B^2$. It will be understood that the details of chute, conveyor and crusher form no part of the present invention and are therefore not described in detail. The crushed lime passing from the hammer mill is received by any suitable conveyor, for example the bucket conveyor $B^3$, which discharges to any suitable hopper $B^4$ and thus to the apron feeder $B^5$.

Referring to Figures 5 and 6, the passage of material from the feeder $B^5$ to the mixing chamber $B^6$ is controlled by the adjustable vanes C, C, the angle of which may be varied by means of any suitable levers $C^1$ movable about toothed segments $C^2$, each provided with any suitable tooth engaging member $C^3$ controlled by the hand lever $C^4$ in association with the hand lever $C^1$. It will be understood that the individual vanes C may thus be independently controlled. $C^5$ is any suitable water line, having the branches $C^6$ $C^7$ extending to opposite sides of the mixing chamber $B^6$. Each such branch is in communication with one of the transverse interior water pipes $C^8$ $C^9$, the pipes being slotted longitudinally, as at $C^{10}$, to project a generally continuous sheet of water into the interior of the mixing chamber. The water sheets so delivered preferably incline somewhat downwardly, and converge.

It will be understood that in general use the vanes C are so adjusted as to direct the flow of a sheet or stream of the finely divided lime to a point slightly to one side of the convergence of the two sheets of water.

The finer particles are instantly mixed with the water thus delivered, but some further emersion and separation is necessary for the larger lime particles. The mixed mass flows or drops into the longitudinal mixing chamber D, of generally cylindrical cross-section. The bottom is provided with a plurality of spaced baffles or obstructions $D^1$. $D^2$ is a longitudinal shaft driven from any suitable power source, through the bevel gears $D^3$ $D^4$ mounted in the bearings $D^5$ $D^6$. It is provided with a plurality of paddles $D^7$, one of such paddles being positioned to pass in close proximity to each of the baffles $D^1$, the angle or shape of the paddle being such as to adapt it to dig or plough out the material gathered against the baffle, as the mass undergoing mixture flows or circulates from right to left, as shown in Figure 5. At the left end of the shaft, as shown in such figure, is positioned a spiral $D^{10}$ of sheet metal, surrounded by a cylindrical screen $D^{11}$. $D^{12}$ is an opening or passage beneath the screen along which the screened material may pass or flow. $D^{14}$ is a discharge chute for such coarse material as fails to pass through the screen but is thrust beyond it by rotation of the spiral $D^{10}$. This material may be discharged in any suitable manner. The slaked and screened lime or milk may flow or be conveyed in any suitable manner along the passages $D^{15}$ to the various curing tanks $D^{16}$.

Figure 10:
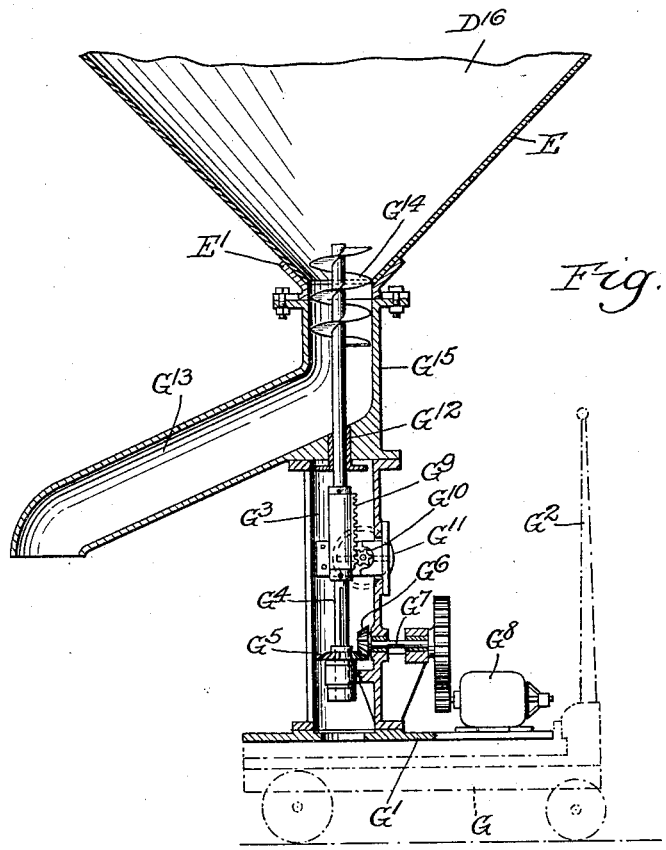
Figure 10 is a similar section through one of such tanks during the discharge of the slaked lime or putty therefrom.
Figure 8:
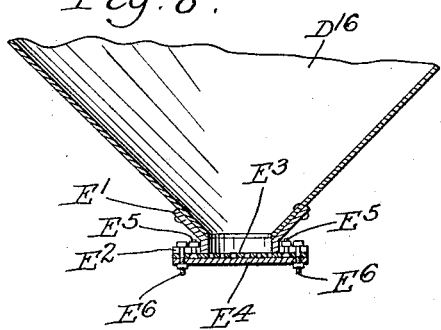
Figure 8 is a vertical section, on an enlarged scale, through the bottom of one of the storage tanks shown in Figure 2.
Figure 9:
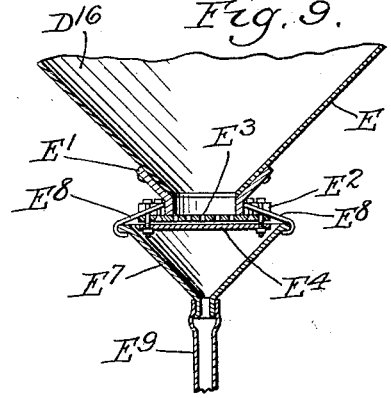
Figure 9 is a similar section through the bottom of one of such tanks, during drainage.

Referring to Figures 8, 9 and 10, each curing tank $D^{16}$ terminates at its bottom in a conic funnel portion E, secured to the apex of which is a lip member $E^1$ provided with an outwardly extending flange $E^2$. $E^3$ is a perforated plate and $E^4$ a solid plate, the two plates being bolted to the flange $E^2$ for example by the bolts $E^5$ and $E^6$.

During the filling of the curing tanks the solid plate $E^4$ is drawn up in position against the perforated plate $E^3$, as shown in Figure 8, to prevent the escape of the inflowing material. During the drainage or settling or curing of the lime or milk in the tanks I release the slotted plate, and, as shown in Figure 9, position it slightly below the perforated plate. I then secure beneath the plates any suitable funnel member $E^7$, for example by the wire fasteners $E^8$ and deliver the water which flows through the perforated plate and into the funnel along any suitable tube $E^9$, for example to the floor drains.

When I wish to discharge the cured lime or putty I remove both the slotted and the perforated plates and center beneath the hopper the structure shown in Figure 10. G is any suitable lift truck the working top $G^1$ of which may be raised or lowered by manipulation of the lever $G^2$. It will be understood that the lift truck forms per se no part of the present invention and is therefore not indicated or described in detail. Such truck, as used in my apparatus and process, carries the vertical standard or tower $G^3$, in which is mounted the shaft $G^4$ upon which is splined the bevel gear $G^5$ in mesh with the gear $G^6$ on the shaft $G^7$ adapted to be rotated by the motor $G^8$. The shaft $G^4$ is provided with a rack $G^9$ in mesh with the pinion $G^{10}$ controlled for example by the hand wheel $G^{11}$. Its upper end passes through the bearing $G^{12}$ in the spout member $G^{13}$ and carries a spiral or worm $G^{14}$. It will be understood that the manipulation of the hand wheel $G^{11}$ raises or lowers such worm $G^{14}$ in relation to the upper spout section $G^{15}$ in which it is housed.

Figure 2:
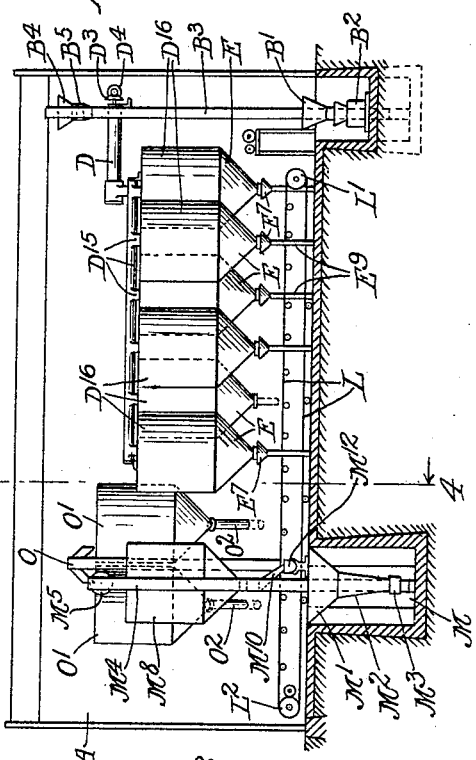
Figure 2 is a side elevation.
Figure 3:
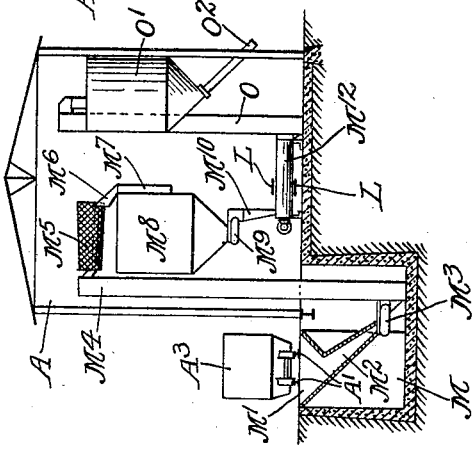
Figure 3 is a section on the line 3—4 of Figure 2, looking in the direction of the arrows.

Referring to Figures 2 to 4, L is any suitable endless conveyor, passing for example about the pulleys $L^1$ $L^2$, and driven for example by the motor $L^3$. The putty may be discharged from the spouts shown in Figure 10, upon such conveyor L for disposal, as below described. Referring particularly to Figure 3, a sand car $A^3$, on the tracks $A^1$, may be spotted over any suitable loading pit M, discharged into the hopper $M^1$ and through the chute $M^2$ to the feeder $M^3$ which discharges to any suitable conveyor or bucket elevator $M^4$. The sand is delivered thence to the rotary screen $M^5$, the over-size passing beyond the screen for disposal along the chute $M^6$ and the passage $M^7$. The material passing through the screen is received in the sand storage tank $M^8$ and is delivered thence through the feeder $M^9$ and the spout $M^{10}$ to any suitable conveyor for example the bucket elevator O which discharges the mixed material to the storage tank or tanks $O^1$, whence it may be withdrawn, as needed, through the spouts $O^2$.

It will be realized that whereas I have described and shown a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to the particular description and drawings herein employed.

Figure 1:
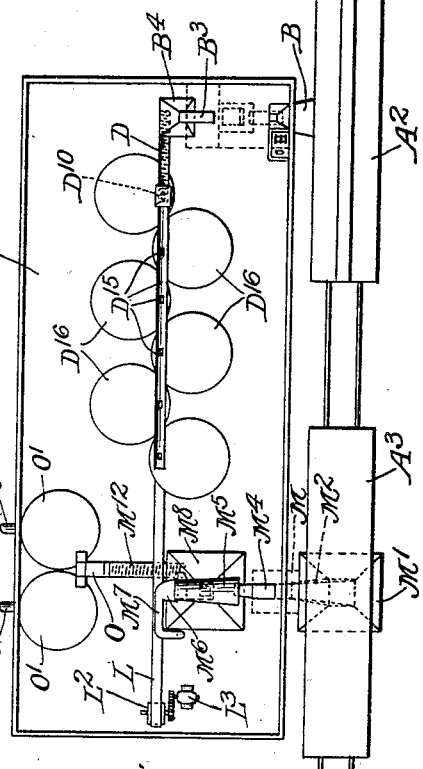
Figure 1 is a plan view of my installation.

The use and operation of my invention are as follows:

Referring to Figures 1 and 2, the lime car $A^2$ delivers lime along the chute B through the conveyor $B^1$, through the hammer mill or crusher $B^2$ and by means of the vertical conveyor $B^3$ to the hopper $B^4$ and through the feeder $B^5$. The lime, relatively finely divided by its passage through the hammer mill $B^2$, is directed by the adjustable vanes C into the mixing chamber $B^6$.

Along each side of such chamber are the longitudinally slotted water pipes $C^7$ $C^8$ which project downwardly and inwardly inclined and converging sheets of water into the mixing chamber. The vanes C are preferably but not necessarily, so positioned as to deliver a relatively thin sheet of lime into the one or the other of the two sheets of water at a point somewhat removed from the convergence of the two sheets. The finely divided particles, suspended in air and more or less separated, are thus subjected to thin, rapidly moving sheets of water, and are readily wetted. The mixture is further effected by the agitation resulting from the contact of the converging sheets of water. In practice the finer particles are substantially all wetted down and the coarser particles are at least externally subjected to the water.

The mixed liquid or paste so formed drops to the bottom of the right end of the conveyor D and is subjected to the agitating and conveying movement of the inclined faced paddles $D^7$. The larger, heavier particles naturally gravitate to the bottom of the mass and as the mass moves to the left they bank up against the low baffles D¹. One of the paddles D⁷ is positioned on the receiving side of each of the baffles and plows out and further mixes the mass of partially slaked or unslaked larger particles there gathered. The result is a very complete mixing or slaking of the lime.

The mixture, at the end of its travel along the conveyor trough D, is passed by the spiral D¹⁰ across the screen D¹¹. All the liquefied or finely divided material flows through the screen and only the oversized lumps pass over the screen to the discharge chute D¹⁴. The mixture flows or is conveyed along the passage D¹⁵ to one of the various curing tanks D¹⁶.

Referring to Figure 8, when the curing tanks are initially filled the solid plate D⁴ is drawn up against the drainage plate D³ to prevent leakage. When the tank is finally filled, containing any suitable ratio of water and lime, the funnel E⁷ is positioned beneath the apex of the tank and the solid plate E⁴ is lowered a slight distance, for example to one-fourth to one-half inch, below the perforated plate E³. The mixed mass of lime pours through the apertures but does not spread laterally, each aperture having issuing from it a column of lime or putty through which flows water from the interior of the tank. This water, as it flows through the tank, is clear and without any perceptible admixture of lime.

I may satisfy myself with simply draining from the tank the superfluous water, but I prefer to introduce further clear water into the top of the tank and to filter it through the lime contained therein. The result is a further curing or bleaching of the lime, and the putty so formed is not only a clear white but is richer and more adhesive than ordinary lime putty.

The putty so formed is too thick to flow freely and I therefore employ positively driven mechanical means for withdrawing it. Referring to Figure 10, I remove both the solid and the perforated plates E³ and E⁴ and position beneath the apex of the tank the spout discharge member G¹³ G¹⁵. Positioned within the vertical portion G¹⁵ is the worm or spiral G¹⁴, which is motor driven. The spiral conforms in diameter to the diameter of the spout, and, as soon as it is filled, the putty acts as an air lock to prevent the passage of air through the spiral. The spiral is raised, for example by the rack G⁹ and the pinion G¹⁰, above the upper end of the vertical portion G¹⁵, and actually penetrates the interior of the apex of the tank. As it rotates, it positively conveys downwardly a volume of putty. The suction so created draws further putty down toward the upper end of the spiral and the increment of the putty positively downwardly moved by the spiral sets up a pressure which downwardly forces a column of putty into the spout G¹³, positively discharging it onto the conveyor L or elsewhere as desired.

I claim:

1. A hydrating installation including a mixing chamber, means for discharging lime thereto, means for discharging water thereto, an additional mixing chamber adapted to receive the mixed lime and water from said first mentioned chamber, an agitating conveyor in said second chamber for causing the material to flow therethrough, a screen associated with the discharge end of the conveyor and arranged to receive the entire body of mixed lime and water, a curing tank, a passage extending from adjacent said screen to said curing tank and adapted to conduct to said tank the material passing through such screen.

2. A hydrating installation including a mixing chamber, means for projecting a substantially continuous sheet of water thereacross, and means for delivering relatively finely divided material through said sheet of water.

3. A mortar mixing installation including a mixing chamber, means for projecting thereacross a plurality of substantially continuous converging sheets of water and means for delivering relatively finely divided material through said sheets.

4. A hydrating installation including a mixture chamber, means for delivering a sheet of water thereacross, means for delivering a relatively finely divided material through said sheet of water, and means for controlling the point of entry of said material into said sheet of water.

5. A hydrating installation including a mixing chamber, means for delivering a sheet of water thereacross, means for delivering a relatively finely divided material through said sheet of water, and means for controlling the point of entry of said material into said sheet of water, comprising an adjustable vane.

6. A hydrating installation including a mixing chamber, means for delivering a sheet of water thereacross, means for delivering a relatively finely divided material through said sheet of water, and means for controlling the point of entry of said material into said sheet of water, comprising a plurality of independently adjustable vanes.

7. A hydrating installation including a mixing chamber and means for delivering a sheet of water thereacross, means for delivering relatively finely divided material through said sheet of water, an additional mixing chamber in communication with said first mentioned mixing chamber and adapted to receive the mixture therein formed, a plurality of transverse baffles spaced along the bottom of said second chamber, and agitating members the paths of movement of which are closely adjacent the receiving side of such baffles.

8. A hydrating installation including a mixing chamber and means for delivering a sheet of water thereacross, means for delivering relatively finely divided material through said sheet of water, an additional mixing chamber in communication with said first mentioned mixing chamber and adapted to receive the mixture therein formed, a plurality of baffles spaced along the bottom of said second chamber, a shaft positioned in said second chamber and means for rotating it, and a plurality of agitating paddles mounted thereupon.

9. A hydrating installation which includes a mixing chamber, means for delivering a substantially continuous sheet of water thereacross, and means for delivering the material to be hydrated through said sheet of water, the general line or flow of the material so delivered being inclined to the general plane of said sheet of water.

Signed at Chicago, county of Cook and State of Illinois, this 3rd day of February, 1928.

CHRISTIAN P. BERG.